United States Patent [19]

Echte et al.

[11] 3,954,722

[45] May 4, 1976

[54] MANUFACTURE OF UNIFORM POLYMERS

[75] Inventors: Adolf Echte, Ludwigshafen; Johann Zizlsperger, Schriesheim; Ernst Tetzlaff, Ludwigshafen; Rudi Wilhelm Reffert, Beindersheim, all of Germany

[73] Assignee: BASF Aktiengesellschaft, Ludwigshafen (Rhine), Germany

[22] Filed: Aug. 26, 1974

[21] Appl. No.: 500,517

[30] Foreign Application Priority Data
Aug. 31, 1973 Germany.............................. 2343871

[52] U.S. Cl.................................. 526/68; 260/95 C; 526/67; 526/78; 526/87; 526/218; 526/227; 526/271; 526/317; 526/328; 526/329; 526/335; 526/341; 526/346; 526/347

[51] Int. Cl.². ...................... C08F 2/02; C08F 2/06

[58] Field of Search.. 260/78.5 HC, 80 M, 85.5 HC, 260/85.5 P, 85.5 R, 86.7, 94.9 P, 95 C

[56] References Cited
UNITED STATES PATENTS

| | | | |
|---|---|---|---|
| 2,777,832 | 1/1957 | Mallison | 260/85.5 P |
| 2,793,199 | 5/1957 | Kurtz | 260/85.5 R |
| 2,847,405 | 8/1958 | Mallison | 260/85.5 P |
| 3,072,622 | 1/1963 | Ham | 260/86.7 |
| 3,080,348 | 3/1963 | Lang et al. | 260/86.7 |
| 3,085,994 | 4/1963 | Muskat | 260/78.5 HC |
| 3,349,070 | 10/1967 | Thayer | 260/85.5 P |
| 3,373,148 | 3/1968 | Mackie et al. | 260/85.5 HC |
| 3,551,396 | 12/1970 | Lanthier | 260/85.5 P |
| 3,578,649 | 5/1971 | Badguerahanian et al. | 260/80 M |
| 3,772,257 | 11/1973 | Bochum et al. | 260/85.5 P |

Primary Examiner—Alan Holler
Attorney, Agent, or Firm—Johnston, Keil, Thompson & Shurtleff

[57] ABSTRACT

A continuous process for the polymerisation of olefinically unsaturated monomers in bulk or in solution in which at least a portion of the low-viscosity materials to be fed to the polymerization zone is thoroughly mixed with a portion of the high-viscosity contents of the polymerization zone in a mixing zone disposed upstream of the polymerization zone, which mixture is then continuously fed to the polymerization zone. The resulting polymers have a uniform composition and a narrow molecular weight distribution. They may be converted to shaped articles by thermoplastic methods.

9 Claims, 1 Drawing Figure

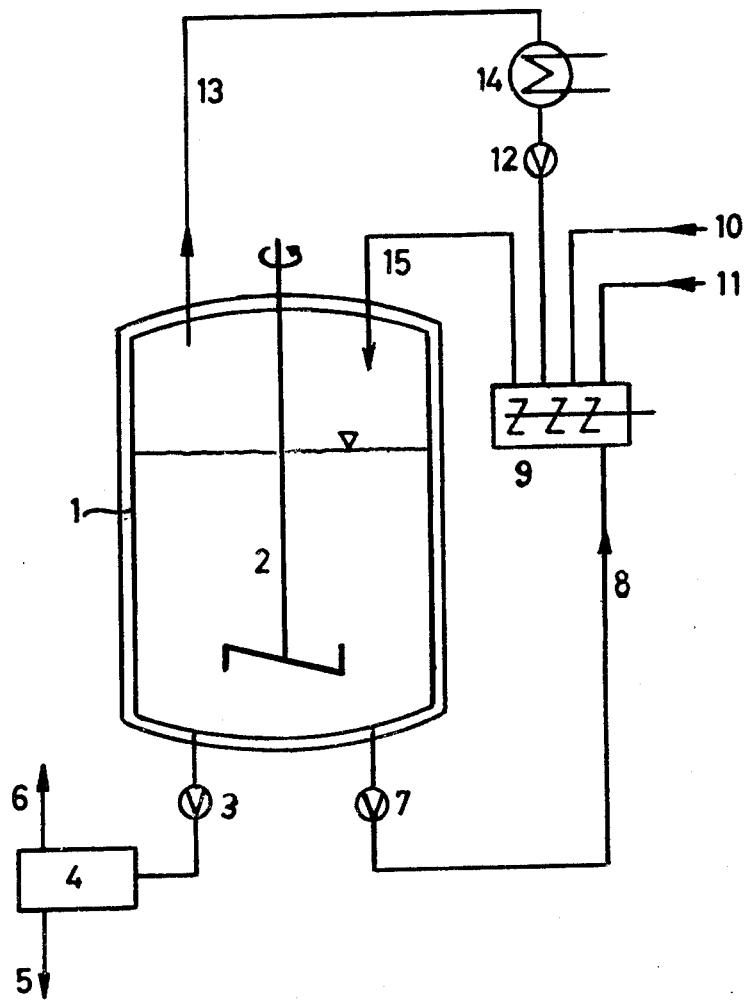

MANUFACTURE OF UNIFORM POLYMERS

This application discloses and claims subject matter described in German patent application P 23 43 871.3, filed Aug. 31, 1973, which is incorporated herein by reference.

This invention relates to a process for the manufacture of polymers of uniform composition and narrow molecular weight distribution by continuous solution polymerization.

In the polymerization of olefinically unsaturated monomers in bulk or in the presence of solvents, there are produced relatively highly viscous solutions of the polymer.

If attempts are made to copolymerize two or more monomers in a batch process, the composition of the copolymer generally varies in the course of polymerization and there are obtained non-uniform products consisting of a mixture of polymers of different compositions.

Batchwise homopolymerization produces a very broad and inconsistent molecular weight distribution due to the variations in concentration during the process.

According to French Pat. No. 1,023,414 and U.S. Pat. No. 2,769,804, polymers of uniform composition and molecular weight distribution are prepared by continuously feeding monomers in constant proportions appropriate to the desired composition of the copolymer to a polymerization zone in which polymerization takes place at a constant temperature, removal of a portion of the contents of the polymerization zone and separation of the volatiles from the polymer. According to one of the above references, the heat of polymerization may be removed at least partly by evaporative cooling. This method of heat removal is particularly advantageous for polymerizations carried out in large batches on an industrial scale.

It has been found, however, that these processes do not always produce uniform polymers in a trouble-free manner over long periods.

For example, when copolymers are produced continuously in stirred vessels in which the reaction is carried out isothermally by evaporative cooling, polymer deposits form on the stirrer shaft in the vortex zone, and such deposits grow and must eventually be removed. Analysis shows that these deposits have a much higher content of lower boiling monomers than the continuously withdrawn copolymer. Furthermore, they have a much higher molecular weight.

Another complication is observed when polymerization is carried out in the presence of free-radical initiators. The outlets of the vessel, the discharge means and pipelines become choked by polymer deposits under continuous operating conditions, since apparently considerable amounts of initiator are entrained despite sufficiently long average residence times.

Some monomers, for example styrene and maleic anhydride, show a definite tendency to form copolymers of alternating structures. If it is desired to produce copolymer from these monomers in which the said alternating relationship does not exist, even intense mixing the reactor cannot prevent the formation of the alternative product which is incompatible with the desired copolymer.

In the continuous homopolymerization of, say, styrene in the presence of small amounts of solvent, deposits again form on the walls of the reactor, which deposits are insufficiently soluble on account of their very high molecular weight.

It may be assumed that all of these phenomena are due to inadequate mixing of the reactor contents with the materials fed thereto, i.e. the monomers, the returned condensate and initiator solution. Uniform mixing is particularly difficult to realize when the contents of the reactor have a much higher viscosity than the materials introduced. This is particularly the case when the solids concentration in the reactor is comparatively high, i.e. when the process is carried out at a conversion of, say, more than 30%.

Even when poor mixing of the materials introduced does not immediately manifest itself as unacceptable, it may still lead to considerable disorder in the internal structure of the copolymers, since excessive accumulation of monomer units may form in the macromolecules. This may be highly detrimental, since characteristic and usually undesirable properties of the homopolymers may show through. For example, above-average sequential lengths of acrylonitrile in a macromolecule consisting of a copolymer of $\alpha$-methylstyrene and acrylonitrile may lead to increased discoloration under thermal stress, whilst the points showing a reduced concentration of acrylonitrile are more likely to crack open under thermal stress.

The aforementioned difficulties are well known and a number of proposals have been made for their avoidance. For example, conventional stirring elements have been replaced by various types of complicated shapes of stirrer or diverse baffles have been installed in the reactors. The main disadvantages of such proposals are the high equipment costs and the high cost of operation due to greatly increased energy consumption of the stirrer drives.

Other proposals, for example, the separate introduction of the various feeds to the polymerization zone at different points of said zone, have led to partial success in the case of smaller equipment but have not proved satisfactory in the case of larger units of industrial interest. Use has also been made of kneaders or screw machines, but these involve high investment costs and possess only a limited reaction volume.

It is an object of the invention to manufacture polymers showing uniform composition and a narrow molecular weight distribution by means of an industrially simple polymerization process.

We have found that this object is achieved in the continuous polymerization of one or more olefinically unsaturated monomers in bulk or in the presence of a solvent in a polymerization zone when at least a portion of the low-viscosity materials to be fed to the polymerization zone is intensely mixed with a portion of the high-viscosity contents of the polymerization zone in a mixing zone disposed upstream of the polymerization zone, the resulting mixture then being continuously fed to the polymerization zone.

This process is applicable to the homo- or co-polymerization of olefinically unsaturated monomers, for example free-radical homopolymerization of styrene, acrylonitrile or methyl methacrylate. It is particularly suitable for the manufacture of copolymers of styrene with acrylonitrile, methacrylonitrile, methyl methacrylate, acrylic acid, acrylates or maleic anhydride and of copolymers of $\alpha$-methylstyrene with acrylonitrile and for the copolymerization of styrene and acrylonitrile in the presence of rubber. It is also applicable to the ionic polymerization, for example the ionic homo- or copolymerization of styrene, α-methylstyrene, methyl methacrylate, butadiene or isoprene.

The polymerization may be carried out in bulk or in the presence of solvents. The use of up to 70% by weight of solvent, based on the monomer solution in the polymerization zone, is satisfactory, and it is preferred to carry out polymerization in the presence of from 5 to 50% by weight of solvent. Suitable solvents are all conventional solvents such as aliphatic, aromatic or chlorinated hydrocarbons, alcohols, ethers or amines, e.g. benzene, toluene, ethylbenzene, carbon tetrachloride, tetrahydrofuran, dioxane and dimethyl formamide. In some cases, water may be suitable as solvent. It is important that the polymer formed be soluble in the monomers or in the mixture of monomer and solvent.

The temperature at which polymerization is carried out may vary within wide limits, for example from −60° to 300°C, and is preferably between 0° and 180°C. It is possible to effect polymerization by heating only, in the absence of initiators, but conventional free-radical initiators may be used if desired, for example peroxides or azo compounds, as also anionic initiators such as organic alkali metal compounds.

The polymerization zone may be in the form of, say, a stirred reactor or flow tube. We prefer to use a vertical reaction vessel in which mixing is very thorough due to powerful stirring, and it is possible to use a number of such vessels arranged in a cascade. Alternatively, a vertical or horizontal flow tube or a vertical tower in which mixing is carried out in the radial direction only by means of a stirrer or a cascade of such towers may be used. In such tubes there is virtually no mixing of the reactor contents in the direction of flow. Ideally, the polymer solution flows through the tube in plug flow.

During polymerization, low-viscosity materials are continuously fed to the polymerization zone. These include the monomers which, together with solvent, are fed at a rate corresponding to the rate at which the polymer mixture is removed from the polymerization zone and worked up. Heat removal is preferably effected by evaporative cooling, such as is described in German applications Ser. Nos. 1,495,145 and 1,520,756. Boiling monomers or solvents are condensed in a cooler and continuously refluxed to the polymerization zone. In the case of polymerizations carried out in the presence of initiators, the initiator is preferably introduced to the polymerization zone in the form of a solution, either continuously or virtually continuously in constant instalments at constant intervals. In this manner, not only initiators but also other additives such as regulators, e.g. mercaptans, lubricants, e.g. butyl stearate and styrene oligomers, and stabilizers, e.g. phenol derivatives, may be introduced.

These added materials have a low viscosity, i.e. their viscosity is generally below 10 poise and preferably between 0.5 and 1 centipoise. By contrast, the viscosity of the polymer solution is very high. It is generally above 100 poise and preferably between 200 and 100,000 poise. The process of the invention is carried out in such a manner that a portion of the polymer solution is removed from the polymerization zone and fed to a mixing zone. Here it is mixed with the feeds and the resulting mixture is continuously fed back to the polymerization zone.

In said mixing zone, the polymerization solution and the feeds are subjected to intense mixing. The mixing means used may be, for example, static mixers such as internal surface generators or dynamic mixers such as toothed disc mixers, turbine impellers, twinworm extruders, mixing kneaders or paddle mixers. Such mixers may, if desired, be equipped with heating and cooling means. The temperature of the liquid in the mixing zone is preferably lower than that of the liquid in the polymerization zone, since the monomer feeds generally have room temperature. The ideal situation is given when the liquids in the polymerization zone and in the mixing zone have approximately the same viscosity. However, homogeneous mixing in the polymerization zone is also obtained when the said viscosities differ by less than 2 tenth powers. Preferably, the viscosity of the liquid in the polymerization zone should not be more than 10 times higher than the visocsity of the liquid in the mixing zone.

Mixing in the reactor is facilitated if the volume of the polymer solution removed from the polymerization zone and fed to the mixing zone is greater than the volume of the feeds.

The residence time of the mixture in the mixing zone should be as short as possible to avoid the occurrence of any appreciable polymerization in the mixing zone. For this reason, the volume of the mixing zone should be much smaller than that of the polymerization zone, preferably at least 10 times smaller.

The invention is further described with reference to the accompanying drawing which represents only one of many conceivable combinations of apparatus for carrying out the process of the invention.

The polymerization liquor is thoroughly mixed in the reactor 1 by means of a stirrer 2. The reaction mixture is continuously withdrawn via discharge means 3 and fed to a processor 4, where the macromolecular material 5 is separated from the volatiles 6. The latter can be purified and re-used, for example looped back to the reactor. A second discharge means 7 causes reaction mixture 8 to be continuously fed to a mixer 9. Monomers plus solvent 10 and initiator solution 11 are concurrently fed to said mixer. The condensate 12 from the evaporative cooler is also fed to the mixer, which condensate evaporates in the reactor due to the heat of reaction to form vapors 13 which are liquefied in the condenser 14. The resulting mixture 15 is then fed to the reactor at a suitable point, for example to the surface of the reactor contents.

EXAMPLE 1a

In a stirred reactor having a cross-blade stirrer and a capacity of 2,500 liters continuous polymerization of α-methylstyrene and acrylonitrile is carried out in the presence of inert solvents and free-radical initiator at 95°C. The stirrer is run at a speed of 60 rpm.

A metering piston pump feeds 356 kg/hr of monomer mixture to the reactor, which mixture consists of 220 kg of α-methylstyrene, 106 kg of acrylonitrile and 29 kg of inert solvent in which 1 kg of azodiisobutyronitrile, acting as free-radical initiator, is dissolved. The solvent is a 90:10 mixture of ethyl toluene and cumene. The mixture is fed to the surface of the reactor contents.

The heat of reaction is removed from the reactor by evaporative cooling according to the method described in German application Ser. No. 1,495,145, the condensate being refluxed to the surface of the reactor contents.

356 kg/hr Of reaction mixture are removed from the bottom of the reactor by means of a gear pump, from which said mixture passes to a devolatilizing extruder in which the volatiles are separated from the copolymer at 270°C. There are obtained 192 kg/hr of solids having an acrylonitrile content of 30% and a viscosity number of 60 (mlg$^{-1}$) (c = 0.5 g/100 ml of dimethyl formamide; 25°C).

After about 100 hours of continuous operation polymer deposit is found to have formed on a stirrer shaft in the vortex region, which deposit grows steadily. After an on-stream period of about 800 hours, discharge of reaction mixture from the reactor comes to a halt and the crust of polymer on the stirrer has reached a diameter of about 60 cm and extends over a portion of the stirrer blades under the surface of the liquid.

The crust of polymer is removed mechanically and is found to weigh about 60 kg. It contains about 42% of acrylonitrile and is virtually free from volatile solvents. The viscosity number is 150 (mlg$^{-1}$).

The discharge unions of the reactor, the inlet and outlet of the gear pump and part of the pipeline to the devolatilizing extruder are choked up with polymer.

EXAMPLE 1b

The stirred reactor of Example 1a is provided with a second discharge pump as illustrated in the accompanying drawing, which pump feeds reaction mixture to the continuous mixer. The mixer used is a toothed-disc mill having a disc of 300 mm in diameter. The toothed disc is run at a speed of 200 rpm. Polymerization is carried out as described in Example 1a except that the condensate in the cooling loop and the monomer mixture are fed to the inlet of the toothed-disc mill. The homogeneous mixture of reaction mixture, condensate and monomers continuously leaving said mill is fed to the reactor and poured onto the surface of the contents thereof.

356 kg/hr of monomer mixture (viscosity less than 0.1 poise) and about 110 kg/hr of condensate having a temperature of 95°C are continuously mixed with about 930 kg/hr of reaction mixture (viscosity about 1,000 poise). The homogeneous mixture has a temperature of 76°C and a viscosity of about 50 poise.

There are obtained 205 kg/hr of solids, this being somewhat more than in the method described in Example 1a, since clearly the free-radical initiator acts more effectively due to the greater degree of homogeneity in the reactor.

Using this method, polymerization may be carried out for more than 2,700 hours without the occurrence of the difficulties described in Example 1a.

EXAMPLE 2a

Styrene and maleic anhydride are polymerized in the presence of dioxane and free-radical initiator at 90°C.

The stirred reactor has a capacity of 2,200 liters and is provided with a multi-stage impulse countercurrent stirrer as described by Weihrauch in Verfahrenstechnik 3 (1969), pp. 243–246. The stirrer is operated at a speed of 60 rpm.

The heat of reaction is removed from the reactor by evaporative cooling by the process described in German application Ser. No. 1,495,145, the condensate being refluxed to the surface of the reaction mixture.

It is desired to prepare a chemically consistent copolymer containing 90% of styrene and 10% of maleic anhydride. The pair of comonomers shows a very marked tendency to alternation leading to the formation of undesirable 1:1 copolymer in batchwise polymerizations.

A mixture consisting of 30.8 kg/hr of styrene, 17.5 kg/hr of dioxane and 0.031 kg/hr of azodiisobutyronitrile is fed to the reactor at 90°C. When the volume of the reaction mixture reaches 2,200 liters, 48.3 kg/hr of reaction mixture having a solids content of 40% are withdrawn from the bottom of the reactor by means of a gear pump and passed to a devolatilizing extruder, where it is separated into polymer and volatiles. There are obtained 19.3 kg/hr of solids. The polystyrene may be converted to colorless clear compression-molded discs at 200°C.

The composition of the reactor feed is now changed in that 1.93 kg of styrene are replaced by maleic anhydride. Compression-molded discs made from the solid product after about 10 hours are cloudy in appearance and those made after about 40 hours are very cloudy.

This phenomonon is to be expected, since the polystyrene and copolymer are incompatible. It is desired, by continuing this continuous polymerization, to effect gradual displacement of all polystyrene from the reactor. Using this method, however, the compression-molded discs obtained after an on-stream period of 200 hours are still not clear. The reason for this is the alternating product, which is not compatible with the desired copolymer and which forms in reaction zones where the monomer proportions are unfavorable. Polymerization is stopped and it is found that the reactor shows hard white deposits on its walls and incrustation of the stirrer. These deposits consist of alternating copolymer.

If the process is modified such that the feed of maleic anhydride solution in dioxane and the feed of initiator in styrene are fed to the reaction mixture at different positions by means of immersed tubes, no satisfactory improvement is achieved and formation of alternating product is not prevented.

EXAMPLE 2b

The stirred reactor is modified according to the accompanying drawing. The mixer used is a mixing tube having a length of 1.5 m and a diameter of 300 mm and containing 30 mixing elements as described by Bruenemann and John in Chemie-Ing.-Techn. 43 (1971), No. 6, pp. 348–354.

Continuous operation is started as described in Example 2a except that the feed of monomers and the condensate in the cooling loop are passed, according to the present invention, to the mixing tube together with reaction mixture to form a homogeneous mixture therein, which is then passed to the reactor. The monomer feed and the condensate are mixed with about three times their total weight of reaction mixture having a viscosity of about 200 poise. The homogeneous mixture has a viscosity of about 25 poise at about 85°C.

Unlike the conventional method described in Example 2a, this polymerization passes through a phase in which the solid product is very cloudy but shows almost no turbidity after about 160 hours and is completely clear after 200 hours. The product contains 10% of maleic anhydride and has a Vicat softening point of 121°C and a viscosity number of 92 (mlg$^{-1}$) (0.5% in dimethyl formamide at 25°C).

We claim:

1. A process for the continuous polymerization of one or more olefinically unsaturated monomers in bulk or in the presence of solvent in a polymerization zone, wherein at least a portion of the low-viscosity materials to be fed to the polymerization zone is thoroughly mixed with a portion of the high-viscosity polymerization liquor contained in the polymerization zone in a mixing zone disposed upstream of the polymerization zone, which mixture is then continuously fed to the polymerization zone, and wherein the viscosity of the polymerization liquor is at least 100 poise and the viscosity of the materials to be fed thereto is less than 10 poise.

2. A polymerization process as claimed in claim 1, wherein the material to be fed to the polymerization zone comprises monomers with solvents.

3. A polymerization process as claimed in claim 1, wherein the heat of polymerization is removed at least partially by evaporative cooling and the materials to be fed to the polymerization zone comprise refluxed condensate from said evaporative cooling.

4. A polymerization process as claimed in claim 1, wherein polymerization is initiated by means of initiators and the materials to be fed to the polymerization zone includes a solution of initiator.

5. A polymerization process as claimed in claim 1, wherein the polymerization liquor contains up to 70% by weight of a solvent.

6. A polymerization process as claimed in claim 1, wherein the volume of the mixing zone is at least 10 times smaller than that of the polymerization zone.

7. A polymerization process as claimed in claim 1, wherein the temperature in the polymerization zone is higher than that in the mixing zone.

8. A polymerization process as set forth in claim 1 wherein the viscosity of the polymerization liquor is from 200 to 100,000 poise and wherein the viscosity of the materials to be fed to the polymerization liquor is from 0.5 to 1 centapoise.

9. A polymerization process as set forth in claim 7 wherein the temperature in the polymerization zone is from 0° to 180°C.

* * * * *